(No Model.)
S. M. GILLETT.
VEHICLE BRAKE.
No. 370,864. Patented Oct. 4, 1887.
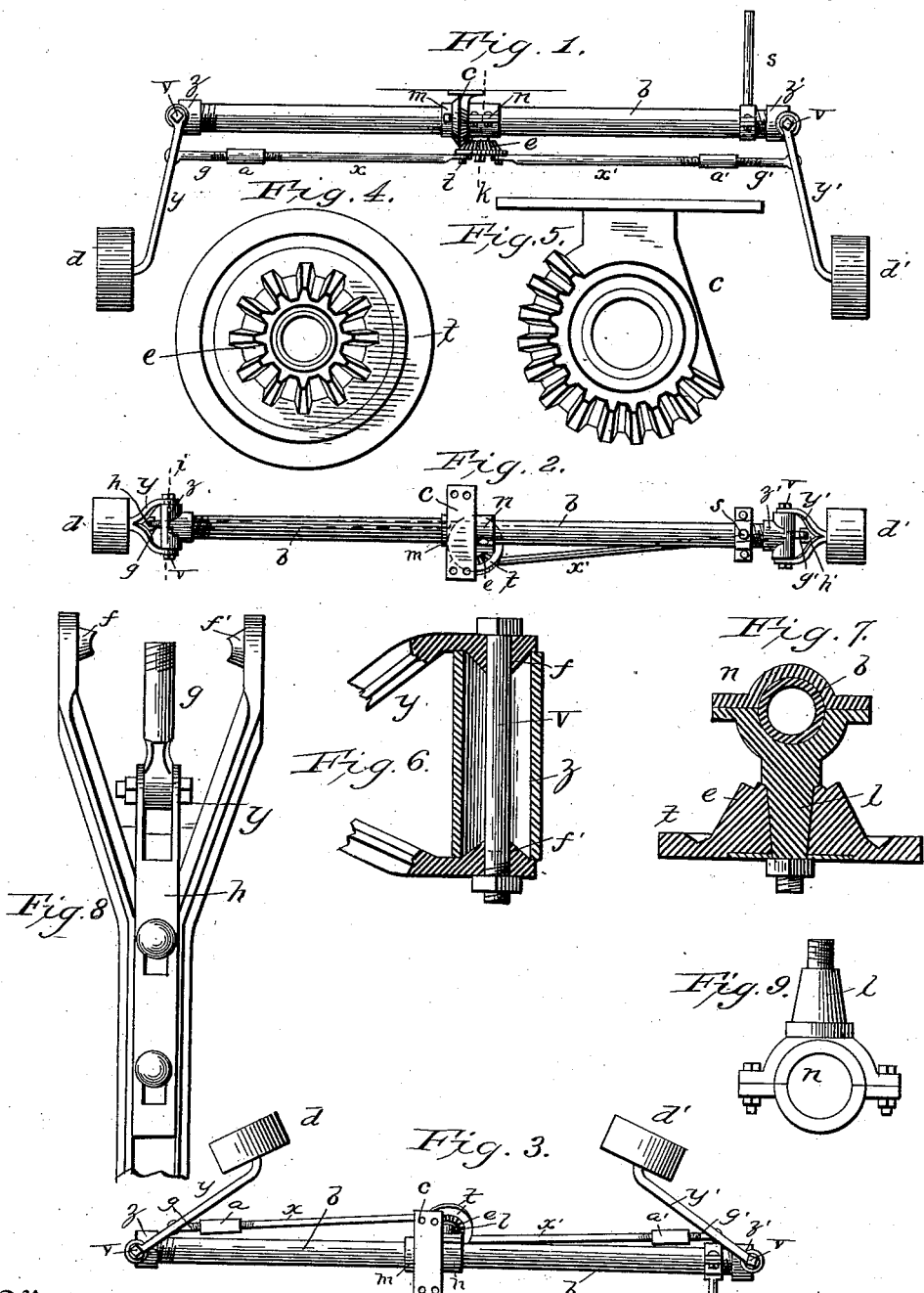
Witnesses
John S. Finch Jr.
C. D. Davis
Inventor
S. M. Gillett
By his Attorney

UNITED STATES PATENT OFFICE.

SYLVANUS M. GILLETT, OF HOMER, NEW YORK, ASSIGNOR TO ALBERTUS D. PERKINS, OF SAME PLACE.

VEHICLE-BRAKE.

SPECIFICATION forming part of Letters Patent No. 370,864, dated October 4, 1887.

Application filed July 8, 1885. Serial No. 171,030. (No model.)

*To all whom it may concern:*

Be it known that I, SYLVANUS M. GILLETT, a citizen of the United States, residing in the town of Homer, in the county of Cortland and State of New York, have invented certain new and useful Improvements in Vehicle-Brakes, of which the following is a specification, reference being had therein to the accompanying drawings.

My invention relates to improvements in vehicle-brakes; and the objects I have in view are, first, to construct a brake in such a manner that the friction-blocks when not in use shall be folded against or under the body of the vehicle, and second, to combine in the construction the greatest possible strength with the least material.

In the accompanying drawings, in which similar letters of reference represent like parts, Figure 1 is a plan of the brake when applied to the wheels. Fig. 2 is a front view when applied to the wheels. Fig. 3 is a plan of the brake when folded. Fig. 4 is a horizontal projection of beveled pinion $e$ and disk $t$, as shown in Fig. 1; Fig. 5, a vertical projection of rack $c$, as shown in Fig. 1; Fig. 6, a section through $i$, Fig. 2; Fig. 7, a section through $k$, Fig. 1; Fig. 8, a vertical projection of arm $y$, looking outward; Fig. 9, a vertical projection of stud and clip, inverted position, as shown in Fig. 1, looking from S.

The main shaft $b$, constructed of a cylindrical tube, is hung to the under side of the body of the vehicle in such a manner as to revolve. Attached to the ends of this shaft by movable joints $z\ z'$ are two arms, $y\ y'$, to which are fastened the friction-blocks $d\ d'$.

To the center of the shaft $b$ is attached a stud, $l$, Fig. 9, which is held in position by a clip. Mounted upon this stud $l$ is a beveled pinion, $e$, Fig. 4, surmounted by a disk, $t$, which is fastened to the beveled pinion. A section of the stud, pinion, and disk is shown in Fig. 7.

Meshing into the teeth of the pinion $e$ is a rack or beveled segment, $c$, through which the cylindrical shaft $b$ passes, and this rack or beveled segment is held in gear by a loose collar, $m$, this collar being held by a set-screw. The rack $c$ is firmly secured to the under side of the body of the vehicle. The shaft $b$ rolls freely and easily in the rack $c$, the latter forming a center bearing, thus enabling a lighter main shaft to be used.

Attached to the arms $y\ y'$ by joints are two rods fastened to opposite sides of the disk $t$. These rods consist each of two parts, $g$ and $x$ and $g'$ and $x'$, coupled by sleeve-nuts $a$ and $a'$, taking right and left threads to lengthen and shorten the rods for adjustment. Completing the joints at the outer ends of the rods are two pendants (one of which is shown in Fig. 8, letter $h$) secured to the inside of the arms $y\ y'$ by bolts. These bolts pass through slots in the pendants for the purpose of adjustment.

At some convenient place on the shaft $b$ is attached a lever, S, held in position by a clip, set-screw, or any other device.

Attached to the lever S is a connecting-rod extending to where the operator of the brake chooses to apply his power.

From the foregoing description it will be readily seen that when power is applied to the lever S the pinion $e$ will roll on the rack $c$, rotating the disk $t$, fastened to the pinion, so as to move the blocks $d\ d'$ from under or against the body of the vehicle to the wheels, and the reverse. When the blocks are on the wheels, the rods attached to the disk are nearly in line, and the blocks may move backward and forward sufficient for overcoming any wear without perceptible lateral motion. For the purpose of moving the blocks out of the way, and under or against vehicle-bodies of different widths, adjustment is made by moving the pendant-joints $h$ nearer to or farther from the pivots $f\ f'$ on the arm, as shown in Fig. 8.

For the purpose of making a perfect adjustment of the friction-blocks upon the wheels of vehicles which track differently we operate the sleeve-nuts $a$ and $a'$, as above described.

The joints $z\ z'$ are constructed of hollow cylindrical T's screwed upon the shaft $b$ with right and left threads to prevent any loosening of arms when blocks are pressing against wheels, or they may be fastened in any other way. In the ends of the T's are concave sockets in which work the pivots $f\ f'$, Fig. 8. The joints are held together by a bolt, as shown in Fig. 6. These joints work easily and freely, with little strain on the bolt, and any wear may be overcome by simply screwing the nut on the bolt.

The operator of the brake, when through using it, by simply reversing the action with the same levers and connecting-rod, and without changing his seat, easily folds the arms and friction-blocks against or under the body of the vehicle.

Having thus carefully and fully described my invention, what I claim, and ask to have secured by Letters Patent, is—

1. The combination of the main shaft, the hollow T's, secured thereto, and the brake-arms pivotally secured to the said T's, substantially as described.

2. In a vehicle-brake, the combination, with the revoluble hollow main shaft, of the hollow T's, secured to the ends thereof, the folding brake-arms pivotally secured to the said T's, and means, substantially as described, for operating said brake-arms.

3. In a vehicle-brake, the concave sockets in the ends of the hollow T's, attached to a main shaft, $b$, and the pivots $f\ f'$ on the prongs of arms $y\ y'$, in combination with the bolt, for the purposes shown and described.

4. In a vehicle-brake, the folding arms $y\ y'$, attached to the ends of a revolving main shaft by movable joints, as shown and described.

5. The stud $l$ and clip, surmounted by the pinion $e$ and disk $t$, together with the rack or beveled segment $c$, and loose collar $m$, substantially as and for the purposes set forth and described.

6. The two-part rods $g$ and $x$ and $g'$ and $x'$, together with the sleeve-nuts $a$ and $a'$, and the pendants $h$ and $h'$, for the purposes set forth and described.

7. The lever S, together with the hollow cylindrical tube $b$, the hollow T's $z\ z'$, the concave sockets and pivots $f\ f'$, the folding arms $y\ y'$, and friction-blocks $d\ d'$, in combination with the stud $l$ and clip, the pinion $e$ and disk $t$, together with the rack or beveled segment $c$, and loose collar $m$, and the two-part rods $g$ and $x$ and $g'$ and $x'$, together with the sleeve-nuts $a$ and $a'$, and pendants $h\ h'$, for the purposes set forth and described.

8. In a vehicle-brake, the combination of the revoluble main shaft, the bifurcated brake-arms pivotally secured to the said main shaft, the pendants $h\ h'$, adjustably secured to the said brake-arms, and operating-rods pivotally secured to the said pendants, substantially as described.

9. The combination of the revoluble main shaft, the folding brake-arms pivotally secured thereto, the adjustable rods pivotally attached to the folding brake-arms, the revolving disk, to which the inner ends of the said rods are connected, and means, substantially as described, for revolving the said disk.

10. In a vehicle-brake, the combination of the main shaft, the pivoted brake-arms, the rods $g\ x$ and $g'\ x'$, adjustably connected together, respectively, for the purpose of adjustment to vehicles of different gages, and means, substantially as described, for operating said rods.

In testimony whereof I affix my signature in presence of two witnesses.

SYLVANUS M. GILLETT.

Witnesses:
H. L. BRONSON,
S. D. PERKINS.